United States Patent [19]

Tamura

[11] 4,098,850
[45] Jul. 4, 1978

[54] ORIFICE DEVICE FOR AIR FLOW RESTRICTION

[75] Inventor: Tooru Tamura, Kariya, Japan

[73] Assignee: Aisin Seiki Kabushiki Kaisha, Kariya, Japan

[21] Appl. No.: 756,270

[22] Filed: Jan. 3, 1977

Related U.S. Application Data

[63] Continuation of Ser. No. 606,932, Aug. 22, 1975, abandoned.

[30] Foreign Application Priority Data

Sep. 4, 1974 [JP] Japan ............... 49-107072

[51] Int. Cl.² ........................................... F02M 3/04
[52] U.S. Cl. ........................... 261/65; 261/DIG. 18; 261/DIG. 19; 123/103 E; 137/513.7; 138/46
[58] Field of Search ........... 123/103 E, 117 A; 261/65, DIG. 19, DIG. 18; 138/45, 46; 137/513.7

[56] References Cited

U.S. PATENT DOCUMENTS

| | | | |
|---|---|---|---|
| 2,777,464 | 1/1957 | Mosely | 138/46 |
| 3,321,173 | 5/1967 | Seger | 138/46 |
| 3,486,491 | 12/1969 | White | 261/DIG. 19 |
| 3,638,626 | 2/1972 | Marshall | 123/117 A |
| 3,670,708 | 6/1972 | Ojala | 261/DIG. 18 |
| 3,678,907 | 7/1972 | Vartanian | 123/117 A |
| 3,766,946 | 10/1973 | Corarg | 138/46 |
| 3,831,567 | 8/1974 | Freismuth et al. | 261/39 B |
| 3,857,373 | 12/1974 | Martin et al. | 123/117 A |
| 3,895,615 | 7/1975 | Schubeck | 123/103 R |
| 3,920,041 | 11/1975 | Gropp | 137/599 |

FOREIGN PATENT DOCUMENTS

| | | | |
|---|---|---|---|
| 1,214,071 | 12/1970 | United Kingdom | 261/DIG. 19 |

*Primary Examiner*—Tim R. Miles
*Attorney, Agent, or Firm*—Burns, Doane, Swecker & Mathis

[57] ABSTRACT

An orifice device communicable with a vacuum source comprises a first and a second orifice means of sintered metal. The first orifice means is usually closed by a flexible one-way check valve which may keep closed when the air flows in one direction and may be released from the first orifice means when the air flows in the other direction. The air flow normally is passed through the second orifice means thereby to be restricted in both directions, whereby the orifice means are effective independently of each other. Another embodiment is disclosed wherein a flexible member is mounted in and restricts flow in one direction through the central portion of a single sintered metal element.

1 Claim, 4 Drawing Figures

ORIFICE DEVICE FOR AIR FLOW RESTRICTION

This is a continuation of application Ser. No. 606,932 filed Aug. 22, 1975, now abandoned.

BACKGROUND OF THE INVENTION

The present invention relates to an orifice device for restricting the air flow and more particularly to an orifice device wherein the air flow is greatly restricted in one direction and is less restricted in the other direction.

SUMMARY OF THE INVENTION

One of the objects of this invention is to provide an orifice device wherein a plurality of orifice means are arranged in parallel relationship to each other so that each orifice means is actuatable independently of another orifice means.

The orifice device according to the present invention is effective particularly when used as a manifold vacuum supply retarding device,- more specifically a throttle valve actuated by an accelerator of the engine-operated vehicle should be controlled to move in such a manner that the emission of undesirable exhaust gas elements such as HC may be minimized and the fuel economy may be good. Therefore, it is another object of the present invention to provide an orifice device which is applicable as vacuum retarding device that will satisfy the requirements of throttle valve control mentioned above.

Other objects, features and advantages of the present invention will become more apparent from the following description, taken with reference to the accompanying drawings.

DETAILED DESCRIPTION OF THE PREFERRED EMBODIMENTS

Figure 1:
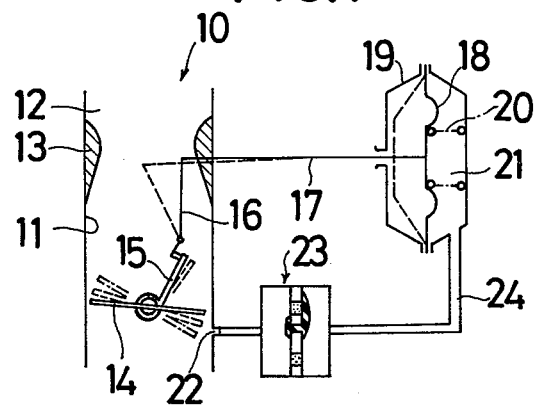
FIG. 1 is a schematic view of a throttle valve control system wherein one embodiment of the invention adapted for a vacuum supply retarding device is illustrated.
Figure 2:
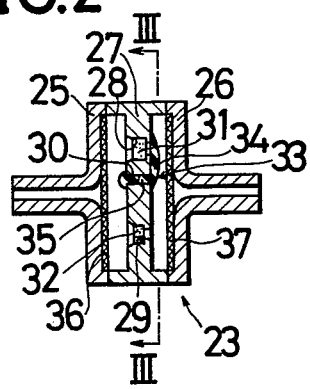
FIG. 2 is a sectional view of one embodiment of FIG. 1 shown in a larger scale.
Figure 3:
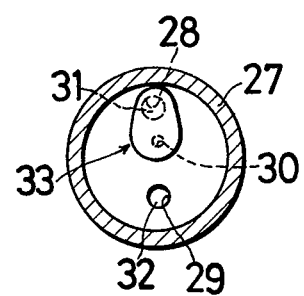
FIG. 3 is a sectional view taken along line III—III of FIG. 2.

Referring now to the drawings, especially FIGS. 1-3 thereof, an embodiment of the present invention is illustrated and an orifice device according to the present invention is adapted for use in a throttle positioning means.

A carburetor 10 comprises a usual air-fuel induction passage 11 with an atmospheric air inlet 12. Passage 11 contains the usual fixed area Venturi 13 and a throttle valve 14. Throttle valve 14 is rotatable from its idling position shown by a solid line in FIG. 1 to its running position shown by a chain-dotted line. It is to be recognized that the running position shown for throttle valve 14 is the position where the throttle valve 14 is usually located during running of the vehicle, and that throttle valve 14 may be rotated to a nearly vertical position essentially unblocking the passage 11 by depression of the accelerator (not shown). Throttle valve 14 may be positioned to its intermediate position — shown by a broken line — wherein the manifold negative pressure is decreased to minimize the emission of gaseous hydrocarbons.

A link arm 15 is connected to throttle valve 14, to be controlled by a lever 16. Lever 16 is mechanically connected to a rod 17 which, in turn, is connected to a diaphragm 18 of diaphragm case 19. Within diaphragm case 19 the diaphragm 18 is urged to move to the left by a spring 20 disposed in a sealingly fitted chamber 21. When no vacuum is applied to chamber 21 and diaphragm 18 is moved to its left end position indicated by a broken line, lever 16 is moved to the position shown by a broken line thereby to locate throttle valve 14 in the intermediate position.

Passage 11 of carburetor 10 includes a vacuum inlet 22 which is adapted to communicate with an intake manifold (not shown) when throttle valve 14 is positioned in its idling position.

A manifold vacuum retarding device 23 is interposed between the carburetor 10 and the diaphragm case 19. More specifically, between vacuum inlet 22 of carburetor 10 and chamber 21 of diaphragm case 19 there is provided a pneumatic passage 24 on which the manifold vacuum retarding device 23 is mounted. The retarding device 23 is provided so as to control the movement of throttle valve 14 between its running position, wherein the vacuum inlet 22 is substantially closed by throttle valve 14, and its intermediate position wherein the emission of undesirable exhaust gas element such as HC is minimized.

Manifold vacuum supply retarding device 23 is shown in detail in FIG. 2. Retarding device 23 includes a first housing 25 at the side of vacuum inlet 22 and a second housing 26 at the side of chamber 21. Between first and second housings 25 and 26 there is interposed an intermediate housing 27 securely fitted to each of housings 25 and 26. Intermediate housing 27 is provided with first, second and third apertures 28, 29 and 30, respectively. First and second metal members 31 and 32 are plugged in the first and the second apertures 28 and 29, respectively, while a one-way check valve 33 is securely inserted in the hind aperture 30. More particularly, the apertures 28 and 29 contain sintered metal (gas-porous) plugs 31 and 32 each consisting of randomly oriented and dispersed multitudes of minute particles compacted together under pressure and passed through a furnace to bond the particles to each other as well known. Check valve 33, made of rubber material, consists of a flapper or umbrella type seal having a flexible membrane 34 secured on an axial stem 35 which is passed through the third aperture 30.

Filter packs 36 and 37 are securely mounted on inside walls of the first and second housing 25 and 26, respectively, thereby to prevent the possible admission of foreign materials into the sintered metal orifices 31 and 32.

It will be apparent that the density of the sintered metal may be varied to control the flow quantity of air and vacuum passing through the sintered metal. In the embodiment shown in FIG. 1, the flow quantity passing through the first sintered metal orifice 31 is adapted to be more than the flow quantity passing through the second sintered metal orifice 32.

In operation, when the accelerator is depressed to set throttle valve 14 at the running position shown by a chain-dotted line, the vacuum inlet 22 of carburetor passage 11 is closed by throttle valve 14 to apply little vacuum to chamber 21, so that lever 16 is kept at the position shown by a broken line. That is to say, as far as throttle valve 14 is positioned at the running position the substantially atmospheric air is applied to the chamber 21 of the diaphragm case 19 through the retarding device 23 wherein the air passes through the sintered metal orifices 31 and 32.

When the accelerator is released to decelerate the vehicle, throttle valve 14 is moved to the intermediate position shown by a broken line and kept in the said position by engagement of link arm 15 with lever 16. Thus, the manifold vacuum is suddenly increased and is applied to vacuum inlet 22. It should be noted that the vacuum is restricted only by the second metal orifice 32 thereby to retard the expelling speed of the atmospheric air existing in chamber 21, because the first metal orifice 31 is kept closed by check valve 33. As a result, throttle valve 14 is returned to its idling position after an interval; in other words, the rightward movement of the diaphragm 18, which will cause throttle valve 14 to move to the idling position, is not started immediately after the accelerator is released. Such a delayed movement of throttle valve 14 is effective to minimize the emission of undesirable exhaust HC, because the fuel may be completely consumed (burned).

When the accelerator has to be frequently operated such as in a traffic jam, the quantity of atmospheric air admitted to chamber 21 is minimal, because the time for closing vacuun inlet 22 by throttle valve 14 is relatively short. Therefore, the vacuum remaining in chamber 21 of diaphragm case 19 will act on the diaphragm 18. Throttle valve 14 is returned to its idling position (indicated by a solid line) without being located at its intermediate position when the accelerator is released. The fuel supply to an engine (not shown) is decreased, since the fuel supply is changed from the main jet to the slow jet and the engine brake is effectively applied since throttle valve 14 may be immediately returned to its idling speed position.

To summarize: the above-mentioned feature of the embodiment of FIGS. 1-3, throttle valve 14 may be kept at the intermediate position for a predetermined time when the accelerator is released during the usual running of the vehicle, so that the fuel can be completely burnt to minimize the emission of HC. When the accelerator is to be frequently manipulated, throttle valve 14 may be immediately moved back to the idle speed position so that the fuel consumption is not worsened and the engine brake performs well.

Figure 4:
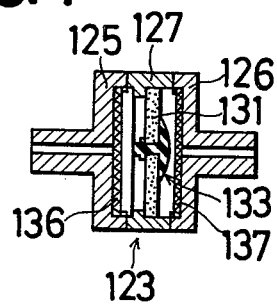
FIG. 4 is a view similar to FIG. 2 but showing another embodiment of the invention.

Referring to FIG. 4, wherein a modified embodiment of the invention is illustrated, it is noted that to each part or element of this embodiment similar to the corresponding part or element of the previous embodiment is added to numeral 100. It will be appreciated that the main difference between both embodiments resides in a single sintered metal plug 131 of a vacuum supply retarding device 123 in place of two sintered metal plugs 31 and 32 of the previous embodiment. A flapper valve 133 secured to sintered metal plug 131 usually covers the central part of the plug and may be released therefrom due to the atmospheric air pressure applying from the left to the right in FIG. 4. Consequently, atmospheric air flowing from the right to the left is relatively restricted, since the central part of sintered metal plug 131 is covered by flapper valve 133 and the air has to pass through a remaining annular part of the plug other than the part covered at its central part thereof. The vacuum supply retarding device 123 may, of course, be applicable to the throttle valve control system as shown in FIG. 1, to obtain the same results as in the foregoing embodiment.

The other construction of the modified embodiment of FIG. 4 will be apparent to those skilled in the art, so that a more detailed explanation thereof may be omitted.

I claim:

1. In an air flow control system including a carburetor comprising a throttle valve and a vacuum inlet, a diaphragm case, and an orifice device interposed between said vacuum inlet and said diaphragm case via a pneumatic flow passage, the improvement wherein said orifice device comprises a housing provided with an inlet port communicable with said vacuum inlet and an outlet port communicable with said diaphragm case;

a sintered metal element secured to said housing; and a valve secured to said sintered element and including a flexible member for closing a central portion of said sintered metal element whereby air flow passing through said orifice device is restricted by said sintered metal element in one direction while it is restricted only by a portion of said sintered metal element other than said central portion in the other direction.

* * * * *